(12) United States Patent
Stirling-Gallacher et al.

(10) Patent No.: US 8,885,774 B2
(45) Date of Patent: Nov. 11, 2014

(54) RECEIVING APPARATUS FOR HIGH FREQUENCY IMAGING SYSTEM

(75) Inventors: Richard Stirling-Gallacher, Dallas, TX (US); Ralf Boehnke, Esslingen (DE); Qi Wang, Esslingen (DE); Stefan Koch, Oppenweiler (DE); Marc Guthoerl, Delmenhorst (DE)

(73) Assignee: Sony Corporation, Tokyo (JP)

( * ) Notice: Subject to any disclaimer, the term of this patent is extended or adjusted under 35 U.S.C. 154(b) by 121 days.

(21) Appl. No.: 13/503,278

(22) PCT Filed: Sep. 2, 2010

(86) PCT No.: PCT/EP2010/062876
§ 371 (c)(1),
(2), (4) Date: Jul. 27, 2012

(87) PCT Pub. No.: WO2011/051029
PCT Pub. Date: May 5, 2011

(65) Prior Publication Data
US 2012/0288033 A1 Nov. 15, 2012

(30) Foreign Application Priority Data
Oct. 29, 2009 (EP) .................................. 09174467

(51) Int. Cl.
| | | |
|---|---|---|
| *H03D 3/00* | (2006.01) | |
| *H01Q 3/38* | (2006.01) | |
| *G01S 13/89* | (2006.01) | |
| *H01Q 3/02* | (2006.01) | |
| *G01S 13/88* | (2006.01) | |
| *G01S 7/03* | (2006.01) | |

(52) U.S. Cl.
CPC *H01Q 3/38* (2013.01); *G01S 13/89* (2013.01); *H01Q 3/02* (2013.01); *G01S 13/887* (2013.01); *G01S 7/03* (2013.01)

USPC ......... 375/322; 375/347; 342/142; 455/276.1

(58) Field of Classification Search
USPC .......................... 342/142; 375/267, 322, 347
See application file for complete search history.

(56) References Cited

U.S. PATENT DOCUMENTS 5,917,447 A 6/1999 Wang et al.
6,088,406 A * 7/2000 Suzuki .......................... 375/343
(Continued)

FOREIGN PATENT DOCUMENTS

| GB | 2 313 711 | 12/1997 |
|---|---|---|
| GB | 2 436 454 | 9/2007 |

(Continued)

OTHER PUBLICATIONS

U.S. Appl. No. 13/682,093, filed Nov. 20, 2012, Stirling-Gallacher.
Lovberg, J.A., et al., "Video-Rate Passive Millimeter-Wave Imaging Using Phased Arrays," IEEE Microwave Symposium, pp. 1689-1692, (2007).

(Continued)

*Primary Examiner* — Leon-Viet Nguyen
(74) *Attorney, Agent, or Firm* — Oblon, Spivak, McClelland, Maier & Neustadt, L.L.P.

(57) ABSTRACT

A receiving apparatus, a receiving method, and an imaging apparatus and method, adapted to receive high frequency image signals. The apparatus includes two or more receiver channels, each receiver channel including an antenna pattern including plural antenna elements to receive high frequency image signals, a receiving mechanism to process the high frequency image signals received by the antenna elements into baseband signals, an analog-to-digital conversion mechanism to convert the baseband signals from the receiving mechanism into digital signals, a phase shifting mechanism to phase shift the digital signals, and a combining mechanism to combine the phase shifted digital signals from the receiver channels into combined signals.

13 Claims, 5 Drawing Sheets

(56) References Cited

U.S. PATENT DOCUMENTS

| | | | |
|---|---|---|---|
| 2002/0068590 A1* | 6/2002 | Suzuki et al. | 455/466 |
| 2003/0117310 A1 | 6/2003 | Kikuchi et al. | |
| 2004/0087294 A1* | 5/2004 | Wang | 455/276.1 |
| 2004/0132414 A1* | 7/2004 | Sendyk et al. | 455/73 |
| 2007/0019763 A1* | 1/2007 | Kim et al. | 375/346 |
| 2007/0126630 A1 | 6/2007 | Coppi et al. | |
| 2007/0222671 A1* | 9/2007 | Nohmi | 342/142 |
| 2007/0230639 A1* | 10/2007 | Stirling-Gallacher | 375/347 |
| 2009/0284405 A1 | 11/2009 | Salmon et al. | |

FOREIGN PATENT DOCUMENTS

| | | |
|---|---|---|
| JP | 2008 406 | 1/2008 |
| WO | 2007 054685 | 5/2007 |

OTHER PUBLICATIONS

Salmon, N.A., et al., "Digital Beam-Forming for Passive Milimetre Wave Security Imaging," $2^{nd}$ European Conference on Antennas and Propagation, Total 11 Pages, (Nov. 11-16, 2007).

Ulabay, F.T., et al., "Microwave Remote Sensing Active and Passive," vol. I, Microwave Remote Sensing Fundamentals and Radiometry, Addison-Wesley Publishing Company, Total 4 Pages, (1981).

Derham, T., et al., "Frequency-encoding Technique for Active MMW Imaging," Proceedings of the Asia-Pacific Microwave Conference, Total 4 Pages, (2006).

International Search Report Issued Dec. 29, 2010 in PCT/EP10/62876 Filed Sep. 2, 2010.

Chinese Search Report and First Office Action issued on Feb. 20, 2014 in application No. 201080049720.7, 13 pages (including English translation of Search Report).

* cited by examiner

RECEIVING APPARATUS FOR HIGH FREQUENCY IMAGING SYSTEM

CROSS-REFERENCE TO RELATED APPLICATIONS

The present application is a national phase application of international application PCT/EP 2010/062876, filed on Sep. 2, 2010, which claims priority of European patent application 09 174 467.2 filed on Oct. 29, 2009, the disclosures of each of which are hereby incorporated herein by reference in their entirety.

FIELD OF THE INVENTION

The present invention relates to the field of radiometric imaging systems, in which high frequency image signals are received or sensed by a receiving apparatus. Application examples for such a receiving or sensing apparatus are imaging systems, security screenings, contraband object detection and the like and enable for example the detection of suspicious items, such as for example weapons, liquids, drugs and so forth, hidden under clothes or hidden in bags to be visualized and presented in an image on a suitable image screen and thus to be easily identified by security personnel. Other examples for potential applications are medical or industrial applications, such as for example for quality control and so forth.

BACKGROUND OF THE INVENTION

Radiometric imaging uses electromagnetic radiation to obtain images of any kind of objects. By using different frequencies/wave lengths, different images can be obtained and different properties of imaged objects can be obtained. The wave lengths ranging from 1.000 mm to 1 mm are commonly referred to as microwaves. Other definitions mention 300 mm for the upper boundary of the microwave spectrum and 10 mm for the lower boundary. Electromagnetic radiation in the range from 100 mm to 10 mm is commonly referred to as centimeter waves and radiation in the range from 10 mm to 1 mm is commonly referred to as millimeter waves. Submillimeter waves are commonly seen as ranging from 1 mm to 0.1 mm, but may also comprise even smaller wave lengths from the far infrared. Submillimeter waves are also referred to as terahertz radiation. The smaller the wave length, the higher is the attainable resolution. Microwaves, millimeter waves and submillimeter waves penetrate for example clothes or bags and may therefore be used to detect objects hidden underneath.

In the field of radiometric imaging, active and passive receivers (or sensors) exist. Eventually, the object may interact with the emitted radiation by other mechanisms than pure reflection and may, for example, transform, modulate, attenuate etc. the radiation or even change its frequency. The term 'reflected radiation' is used to refer to all response radiation emitted, reflected, generated or the like by the object. Active sensors in the microwave spectrum are commonly referred to as radar sensors. However, active sensors could work in the microwave, millimeter wave and terahertz region. Passive sensors (or receivers) sense or receive electromagnetic radiation emitted from an object without generating and transmitting electromagnetic radiation towards the object. An example of a passive sensor is a sensor sensing millimeter waves, submillimeter waves or terahertz waves emitted by an object according to Planck's law (black body radiation) as they are for example used in security screening devices at airports or other menus requiring the checking for contraband objects such as weapons, liquids, bombs, knives, metal, etc. carried under clothes or in bags not being detectable by a human eye.

In order to obtain an image of an object, sensing devices (receiving devices) must scan a two-dimensional field of view. Hereby, it is possible to use one-dimensional antenna arrays having a one-dimensional line of antenna elements or antenna patches which are electronically or mechanically moved in order to create a two-dimensional image. Another possibility to create a two-dimensional image is the use of phased array antennas comprising a plurality of single antenna elements arranged in two dimensions and to perform a full electronic scan by varying the phase of each individual antenna element or patch.

The scanning in order to achieve a two-dimensional image is typically performed by mechanically moving a sharp beam antenna (or a one-dimensional arrangement of sharp beam antenna elements or patches) in the azimuth and elevation directions, where each position corresponds to one pixel of the final image. In order for the sensor or receiver to be effective, it needs to identify the radiated temperature differences between the object to be detected and its surroundings, for example the difference between the human body temperature and the hidden objects underneath the clothes. In order to resolve these temperature differences in prior art systems, the received signal is integrated for each pixel for a fixed period of time, whereby the temperature resolution is inversely proportional to the integration time. In order to achieve sufficient temperature resolution, typical prior art systems are therefore very slow since the sharp antenna beam needs to stay at each position for the duration of the required integration time. Alternatively, some prior art systems achieve a reasonable scanning speed by implementing a high number of parallel receivers which can integrate multiple spots (pixels) in parallel, but which, however, lead to a very costly solution due to the complex structure of the devices.

BRIEF SUMMARY OF THE INVENTION

The object of the present invention is therefore to provide a receiving apparatus and method as well as an imaging apparatus and method which allow an imaging of objects with a fine temperature resolution or high sensitivity on the one hand and a comparatively simple structure on the other hand.

The above object is achieved by a receiving apparatus adapted to receive high frequency signals and adapted to provide combined signals based on the received high frequency signals, the combined signals enabling generation of an image, comprising:
two or more receiver channels, each receiver channel comprising an antenna pattern comprising plural antenna elements, the antenna elements adapted to receive high frequency signals;
a receiving means to process the high frequency signals received by the antenna elements into baseband signals;
an analog-to-digital conversion means adapted to convert the baseband signals from the receiving means into digital signals;
phase shifting means to phase shift the digital signals;
combining means to combine the phase shifted digital signals from the receiver channels into the combined signals.

The above object is further achieved by a receiving method for receiving high frequency signals and for providing combined signals based on the received high frequency signals, the combined signals enabling generation of an image, comprising:

in each of two or more receiving channels, each receiving channel comprising an antenna pattern with plural antenna elements;
receiving high frequency signals in each of the antenna elements;
processing the high frequency signals received by the antenna elements into baseband signals;
analog-to-digital converting the baseband signals into digital signals;
phase shifting the digital signals; and
combining the phase shifted digital signals from each of the receiving channels into the combined signals.

The above object is further achieved by an imaging apparatus comprising a receiving apparatus according to the present invention and processing means adapted to generate an image from the combined signals obtained from the combining means.

The above object is further achieved by an imaging method comprising the receiving method steps according to the present invention and further comprising the step of generating an image from the combined signals.

The receiving apparatus according to the present invention is adapted to receive high frequency signals and adapted to provide combined signals based on the received high frequency signals, said combined signals enabling generation of an image. The receiving apparatus comprises two or more receiver channels, each receiver channel comprising an antenna pattern comprising several antenna elements, said antenna elements being adapted to receive high frequency signals, a receiving means adapted to process the high frequency signals received by said antenna elements into baseband signals, analogue-to-digital conversion means adapted to convert the baseband signals from the receiving means into digital signals, and phase shifting means adapted to phase shift the digital signals, wherein said receiving apparatus further comprises combining means adapted to combine the phase shifted digital signals from the receiver channels into the combined signals.

The receiving method according to the present invention is adapted for receiving high frequency image signals and for providing combined signals based on the received high frequency signals, said combined signals enabling generation of an image. The method comprises, in each of two or more receiving channels, each receiving channel comprising an antenna pattern with several antenna elements, the steps of receiving high frequency signals in each of said antenna elements, processing the high frequency signals received by said antenna elements into baseband signals, analogue-to-digital converting the baseband signals into digital signals, and phase shifting the digital signals, and combining the phase shifted digital signals from each of the receiving channels into the combined signals.

The imaging method according to the present invention comprises the steps of the receiving method of the present invention, and additionally the step of generating an image from the combined signals.

The present invention therefore suggests using digital beam forming at the baseband by phase combining a number of signals obtained from a number of antenna patterns in order to enable imaging with a high sensitivity (fine resolution) with a simple structure or arrangement. The present invention is advantageous over the prior art as it is not necessary to implement a large number of wideband radio frequency (high frequency) phase shifters. Further, only a relatively low number of analogue-to-digital converters is necessary in the present invention while enabling faster processing and a higher temperature sensitivity as compared to the prior art.

Additionally, the signal processing complexity required by the present invention is lower as compared to known systems.

The present invention is adapted to operate for active and passive imaging system of any kind and in all suitable high frequency regions as explained in the introduction.

Advantageously, the receiving apparatus of the present invention comprises phase shift control means adapted to vary the phase shifts of the phase shifting means of the receiver channels.

Further advantageously, the digital signals output from the analogue-to-digital conversion means are complex signals and said phase shifting means are adapted to perform a complex multiplication.

Further advantageously, the digital signals output from the analogue-to-digital conversion means are complex signals and said combining means is adapted to perform a complex summation.

Further advantageously, the receiving apparatus of the present invention comprises mechanical steering means adapted to mechanically steer said antenna patterns. In this aspect of the present invention, a combination of a mechanical and an electronic scanning method is suggested, in which, typically in one dimension of the two-dimensional image to be generated, electronic scanning is performed by varying the phase shifts, and scanning in the other dimension is performed by a mechanical movement of the antenna patterns.

Alternatively, each receiver channel comprises a Fourier transformation means arranged after the analogue-to-digital conversion means and adapted to perform a Fourier transformation on the digital signals, said Fourier transformation means being adapted to perform a F point transformation and having F output lines, F being an integer (any suitable integer equal or larger than 1). In this aspect of the present invention, electronic scanning in both dimensions of the two-dimensional image to be generated is performed. In the first dimension, scanning is performed by varying the phase shifts. In the second dimension, scanning is performed by frequency steering the antenna elements of the antenna pattern by using a variation of a local oscillator frequency and the mentioned Fourier transformation means.

In this aspect of the invention, the receiving apparatus advantageously comprises N combining means wherein the phase shifting means are respectively arranged between the analogue-to-digital conversion means and the Fourier transformation means, and wherein each of the F combining means receives the respective F-th output line from each Fourier transformation means. In other words, each of the F combining means receives one output line (the respective F-th output line) from each of the Fourier transformation means, i. e. each of the combining means receives a number of output lines from the Fourier transformation means which is identical to the number of receiver channels.

Alternatively, under the same aspect of the present invention, the receiving apparatus advantageously comprises F combining means, wherein the phase shifting means are respectively arranged in each of the F output lines of the Fourier transformation means, and wherein each of the F combining means receives the respective F-th output line from each of the Fourier transformation means. In other words, each combining means receives the phase shifted output signal of one output line of each Fourier transformation means, i. e. each combining means receives a number of lines which is identical to the number of receiver channels in the receiving apparatus.

Further alternatively, under this aspect of the present invention, the receiving apparatus advantageously comprises F×L combining means, wherein each of the F output lines of each of the Fourier transformation means is branched into L branches (or output lines), each branch (or output line) comprising a respective phase shifting means, and wherein each of the combining means receive the (phase shifted) L-th branch (output line) of each one of the respective F-th output lines from each Fourier transformation means.

Further advantageously, the receiving apparatus of the present invention comprises local oscillator means adapted to provide a local oscillator signal to each of the receiving means and local oscillator control means adapted to vary the frequency of the local oscillator signals in order to vary the receiving characteristics of the antenna patterns and thus to perform a frequency steering of the antenna patterns.

The imaging apparatus of the present invention comprises a receiving apparatus as described above and additionally processing means adapted to generate an image from the combined signals obtained from the combining means. The specific structure of the processing means depends on the specific implementation. For example, in case of the imaging apparatus being a passive imaging apparatus, the processing means may comprise absolute value calculation means and integration calculation means and the further necessary processing elements in order to obtain a two-dimensional image and to display the image on a suitable screen or the like. In case of the imaging apparatus being an active imaging apparatus, the processing means will require other processing elements in order to transform the output signals from the combining means into a two-dimensional image which can be represented on an image screen or the like.

It has to be understood that the receiving apparatus, imaging apparatus as well as the receiving method and the imaging method of the present invention can be applied to any kind of suitable application in which high frequency signals are received or sensed or detected in order to be represented in an image on a suitable image screen or the like. The detection or sensing of image signals by means of the antenna patterns comprising several antenna elements hereby means that an object or objects are sensed in a wireless manner in a frequency region which is particularly suitable for detecting the object. The term 'high frequency' is hereby intended to cover all potentially suitable frequency areas as mentioned in the introduction of the present specification.

BRIEF DESCRIPTION OF THE DRAWINGS

The present invention is explained in more detail in the following description of preferred embodiments in relation to the enclosed drawings, in which.

DETAILED DESCRIPTION OF PREFERRED EMBODIMENTS

Before explaining the invention in detail, it is useful to discuss the basic theory of radiometers for passive imaging and the different approaches. For a standard total power radiometer receiver used in passive imaging the temperature resolution ΔT is given by $$\Delta T = \frac{T_A + T_{REC}}{\sqrt{Bt}}$$

Where $T_A$ is the temperature to be measured at the receiver input, $T_{REC}$ is the noise temperature of the receiver, B is the bandwidth of the signal for each spot and t is the integration time. Since the bandwidth of the spot B and the receiver noise temperature $T_{REC}$ (which is related to the noise figure of the receiver) are typically set by hardware constraints (especially at challenging millimeter and terahertz frequencies) a certain integration time t has to be used, to achieve the required temperature sensitivity. For typical security application the required temperature resolution may be as low as 0.3 degrees Kelvin.

To form a complete image frame consisting of X pixels wide and Y pixels high, a sharp beam antenna can be mechanically moved to the different positions on the item to be scanned. The total time to form the image (not including the mechanical movement time) is therefore given by X×Y×t seconds which for typical security applications requiring fine temperature resolution (high sensitivity) can be a long time.

To alleviate this issue, complete parallel receivers with mechanical scanning can be implemented where each receiver examines different parts (normally one pixel) of the complete image in parallel to increase speed. If we assume that P parallel receivers are used, the total time for a complete image is therefore $$\frac{X \times Y \times t}{P}.$$

The drawback of this approach however is that the cost becomes prohibitively high, since P times the hardware is needed.

For this reason and to eliminate unreliable mechanical parts needed for mechanical scanning the present invention suggests electronic scanning for passive (and active) imaging. One advantage of the invention is to achieve such an approach with a reasonable amount of RF hardware and signal processing complexity.

Figure 1:
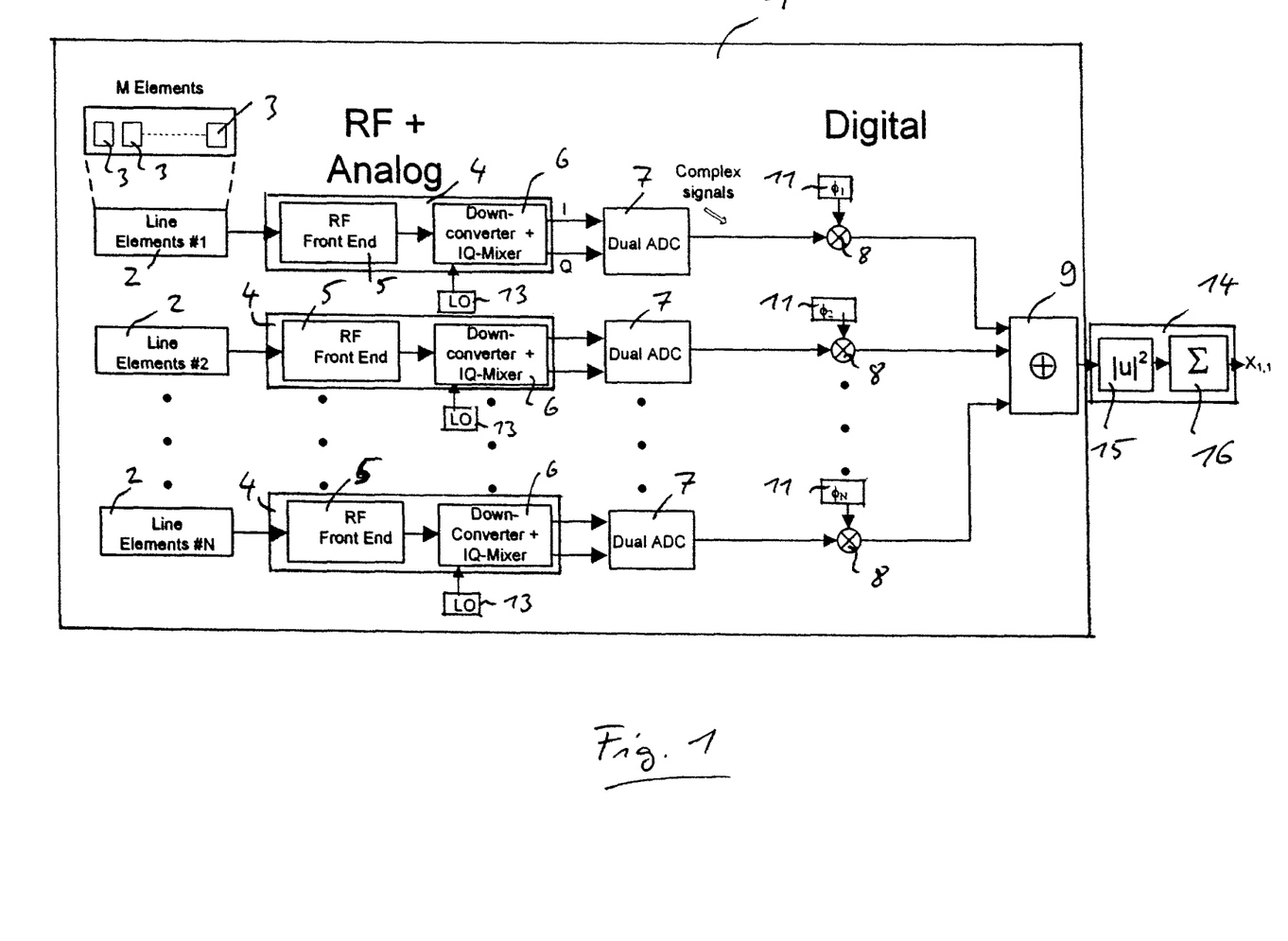
FIG. 1 shows a schematic block diagram of a first embodiment of a receiving apparatus and processing means of the present invention.

FIG. 1 shows a first embodiment of a receiving apparatus 1 according to the present invention. The receiving apparatus 1 of the present invention comprises two or more receiver channels, in the first embodiment shown in FIG. 1, the receiving apparatus 1 comprises N receiver channels, N being an integer larger than 0. Each receiver channel of the receiving apparatus 1 comprises the identical elements. As shown in FIG. 1, each receiver channel comprises an antenna pattern 2 with several antenna elements 3, in the shown example M antenna elements 3, M being an integer larger than 1. The term 'antenna element 3' hereby characterizes a single antenna element in the form of a patch antenna or the like. Each antenna element 3 and thus each antenna pattern 2 is adapted to receive high frequency signals and specifically to sense and receive high frequency signals radiated from an object of any kind either as part of an active imaging system or a passive imaging system as explained above. In the example shown in FIG. 1, the antenna elements 3 are arranged in a straight line, but they could be arranged in any kind of arrangement including any kind of one- or two-dimensional arrangements as suitable for the respective application. The high frequency signals taken up and received by antenna pattern 2 are forwarded to a receiving means 4 which is adapted to process the high frequency (image) signals into baseband signals which are then supplied as a I part and a Q part to an analogue-to-digital conversion means 7 (in the shown example a dual analogue-to-digital conversion means). The receiving means 4 may for example comprise a RF (radio frequency) or HF (high frequency) front end 5 which consists of one or more low noise amplifiers. The receiving means 4 further may comprise a down conversion and IQ mixing means 6 adapted to down convert the signals output from the front end 5 into the baseband as IQ signals. Alternatively, several down converting stages could be provided with respective stages of intermediate amplifiers. The down conversion function is supplied with a local oscillator signal from various individual or one common local oscillator means 13.

The digital signals output from the analogue-to-digital conversion means 7 (which are typically complex signals) are supplied to a phase shifting means 8 which is adapted to shift the phase of the complex digital signals output from the analogue-to-digital conversion means 7. As shown in the example of FIG. 1, the phase shifting means 8 can for example be implemented by a complex multiplication of the output of the analogue-to-digital conversion means 7 by $$e^{j\theta}=(\cos(\theta)+j\times\sin(\theta)).$$

Figure 2:
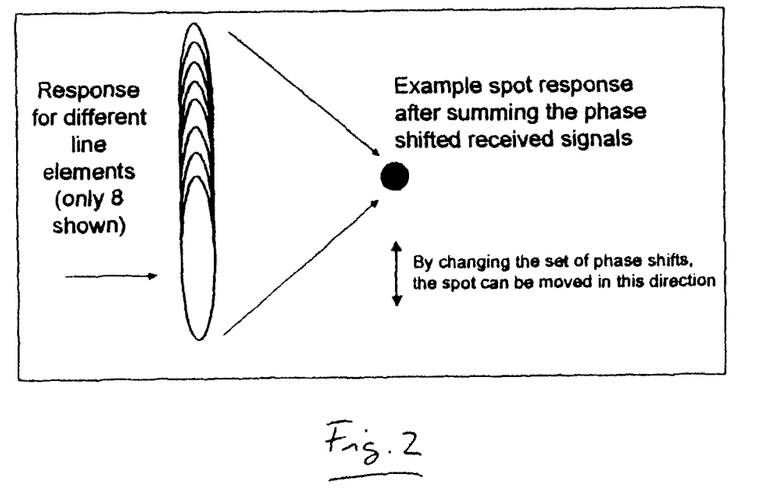
FIG. 2 shows a schematic explanation of phase combining of the antenna characteristics, FIG. 3 schematically explains the scanning of a two-dimensional image pixel space in the first embodiment.
Figure 3:
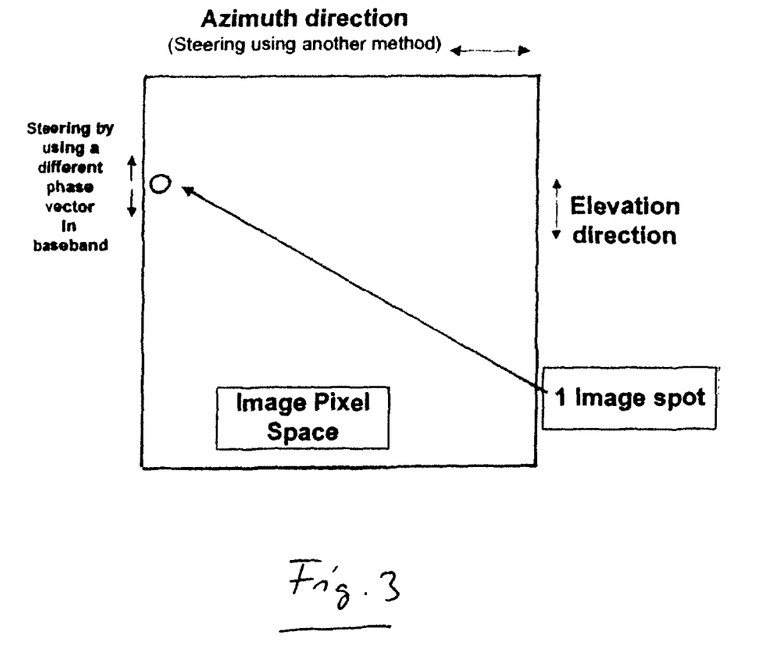

As shown in FIG. 1, the phase shift performed by the phase shifting means 8 is respectively controlled by a phase shift control means 11 which is also part of the receiving apparatus 1. The phase shift control means 11 of the first receiver channel controls the phase shifting means 8 to phase shift the digital signals by $\phi_1$. The phase shift control means 11 of the second receiver channel controls the phase shifting means 8 to phase shift the digital signals by a phase shift of $\phi_2$ and the phase shift from control means 11 of the N-th receiver channel applies a phase shift of $\phi_N$ as shown in FIG. 1. In a typical implementation the phase shift control means 11 of the N receiver channels are the same (one common) phase shift control means for all receiver channels, but it may be possible to use different phase shift control means 11 for the various receiver channels. However, in this case a central control element appears to be necessary to control the various phase shift control means 11. By applying suitable phase shifts to the digital signals in the N receiver channels, the receiving characteristics of the antenna patterns 2 can be shaped and controlled to form narrow or sharp antenna beams as visualized in FIG. 2. FIG. 2 shows the situation for N=8 antenna patterns 2 respectively having a narrow beam characteristic. It is advantageous if the beam characteristics of each antenna pattern 2 in the receiving apparatus 1 overlap in order to be able to process image information of one spot (one pixel) at a time. This is done by a combining means 9 which is for example a complex summation means adapted to perform a complex summing of the phase shifted digital signals received from the phase shifting means 8 in the various receiver channels. The combined digital signal output from the combining means 9 is then further processed in a processing means 14 depending on the respective implementation. In case that the receiving apparatus 1 and the processing means 14 are part of a passive imaging apparatus, the processing means 14 may comprise a means 15 to perform an absolute value calculation operation and an integrating means 16 adapted to integrate the signal for the required integration time t. In an active imaging system, the output of the combining means 9 would be processed in a different way.

By varying the phase shifts $\phi_1$, $\phi_2$, ... $\phi_N$, the phase shift control means 11 are adapted to move the position of the sharp spot (or pixel) in one dimension of the to be detected two-dimensional image, as shown in FIG. 2. In the example shown in FIG. 2, the variation of the phase shifts moves the spot in the elevation direction, where depending on the implementation, any other direction could be chosen. By a phase shift variation in the parallel receiver channels, the detected or received spot of the target area to be scanned can be scanned in one direction while the image information of the different spots are further processed in the processing means 14 in a serial fashion. In order to move the spot in the other dimension of the two-dimensional image space (for example the azimuth direction), any suitable implementation could be chosen, either mechanical or electronic. In case that a mechanical implementation is chosen, in which the antenna elements 3 of the antenna patterns 2 are mechanically moved in the azimuth direction a hybrid of a electronic and a mechanical scanning method would be the result.

However, as mentioned, also an electronic scanning in the second dimension of the image space can be implemented, as will be explained further below in relation to the second and the third embodiments.

Figure 4:
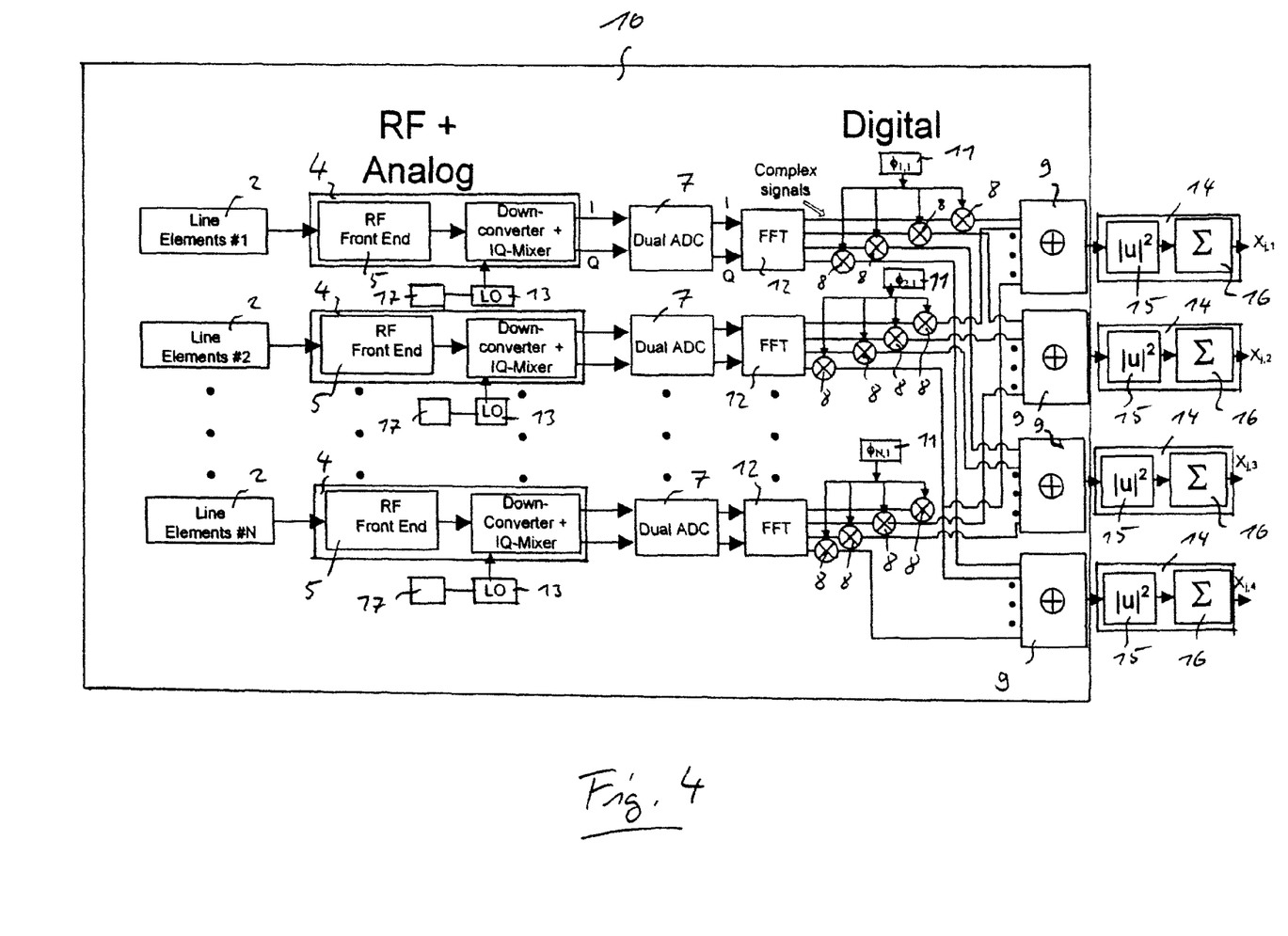
FIG. 4 shows a schematic block diagram of a second embodiment of a receiving apparatus and a processing means of the present invention, FIG. 5 schematically shows the scanning of a two-dimensional image pixel space in the second embodiment.
Figure 5:
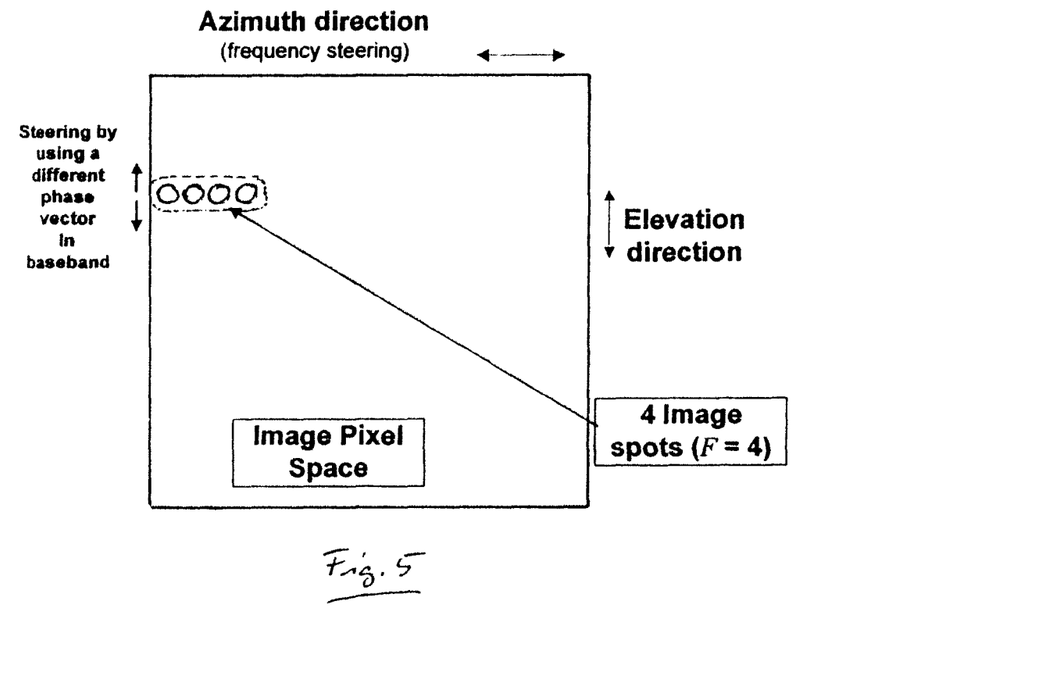

FIG. 4 shows a schematic block diagram of a receiving apparatus 10 according to the present invention and four processing means 14. The general idea of the second as well as the third embodiment is to operate the elements 3 of the antenna patterns 2 of the N receiver channels as frequency steered antennas, so that the exact peak position of the response (i. e. the detected spot) in the azimuth direction depends upon the respective chosen F-output of the FFT and on the frequency which is used to down convert the received high frequency signals in the respective receiving means 4, i. e. the frequency of the local oscillator 13 of each receiver channel which supplies a local oscillator signal to the down converter 6 of each of the receiving means 4 in each receiver channel. By varying the local oscillator signals supplied by the local oscillator means 13, for example under control of a local oscillator control means 17 in each receiver channel, the center frequency of the radio frequency signal which is down-converted is changed and different azimuth positions of the radiation patterns of the antenna patterns 2 can be assumed with small step sizes and can then be examined using a Fast Fourier Transformation in a FFT means to resolve the different frequency steps.

The structure and the elements comprised in the receiving means 10 of the second embodiment of the present invention are identical to the elements of the receiving apparatus 1 of the first embodiments and all statements made above in relation to the first embodiments also apply to the second embodiment, except that each receiver channel comprises a FFT means 12 arranged after the analogue-to-digital conversion means 7 adapted to perform a Fourier transformation on the complex digital signals (IQ part) output from the analogue-to-digital conversion means 7. The Fourier transformation means 12 are respectively adapted to perform a F-point Fourier transformation (F being an integer larger than 1) and each Fourier transformation means 12 has F output lines. Hereby, the receiving apparatus 10 comprises F combining means 9, wherein the phase shifting means 8 are respectively arranged in each of the F output lines of each Fourier transformation means 12 and wherein each of the F combining means 9 receives the respective (phase shifted) F-th output line from each Fourier transformation means. In the example of the second embodiment, the FFT means 12 are respectively 4 point FFT means with respective 4 output lines, each output line having a phase shifting means 8, whereby the phase shifting means 8 of each receiver channel are controlled by a phase shift control means 11 in the same way as described for the first embodiment. It is to be noted that the phase shift means 8 in the output lines of the FFT means 12 of each receiver channel of the receiving apparatus 10 respectively apply the same phase shift to the signals output from the FFT means 12. Since the FFT means 12 of the second embodiment are 4 point FFT means 12 in the shown example, the receiving apparatus 10 comprises 4 combining means 9, each of the combining means 9 combining the signals of the first, second, third and fourth output line, respectively, from the FFT means 12 of each receiver channel. Otherwise the functionalities of the phase shifting means 8 and the combining means 9 of the second embodiment are identical to the respective functionalities already described in the first embodiment.

In an alternative solution of the second embodiment, the phase shifting means 8, instead of being located in the output lines of the FFT means 12, could be located in the I and the Q line between the analogue-to-digital conversion means 7 and the FFT means 12.

As stated above, the example of a 4 point FFT means 12 is only an example and any size of FFT can be used, but in practice the size of the FFT is limited by the required bandwidth for each image spot to be detected and the bandwidth which the respective analogue-to-digital conversion means 7 are able to provide. The 4 image spots that the example of the second embodiment can provide are shown in the schematic image space of FIG. 4. The great advantage of this approach is that F pixels (spots) can be processed at the same time and therefore the time needed to electronically scan the image pixel space can be greatly reduced. Alternatively, the temperature sensitivity can be improved for the same processing and scanning time. In order to scan the two-dimensional image space in the azimuth direction, which effectively moves the 4 image spots in the azimuth direction, a variation of the frequencies used for the local oscillators 13 are used. The exact local oscillator frequency step to be used depends on the bandwidth of each spot and the size (F) of the FFT means 12. It is to be noted that typically a local oscillator signal with the same frequency is supplied to each of the down conversion means 6 of the receiving means 4 in each receiver channel, so that the local oscillator signal could be generated and provided by one common local oscillator means 13 controlled by one common local oscillator control means 17.

The processing of the combined signal output from each of the combining means 9 depend on the respective implementation of the receiving apparatus in a passive or an active imaging system as explained above in relation to the first embodiment. Each combined signal output from the combining means is thus supplied to a corresponding processing means 14 adapted to perform the respectively needed further processing in order to generate the respective image signal as explained in relation to the first embodiment.

Figure 6:
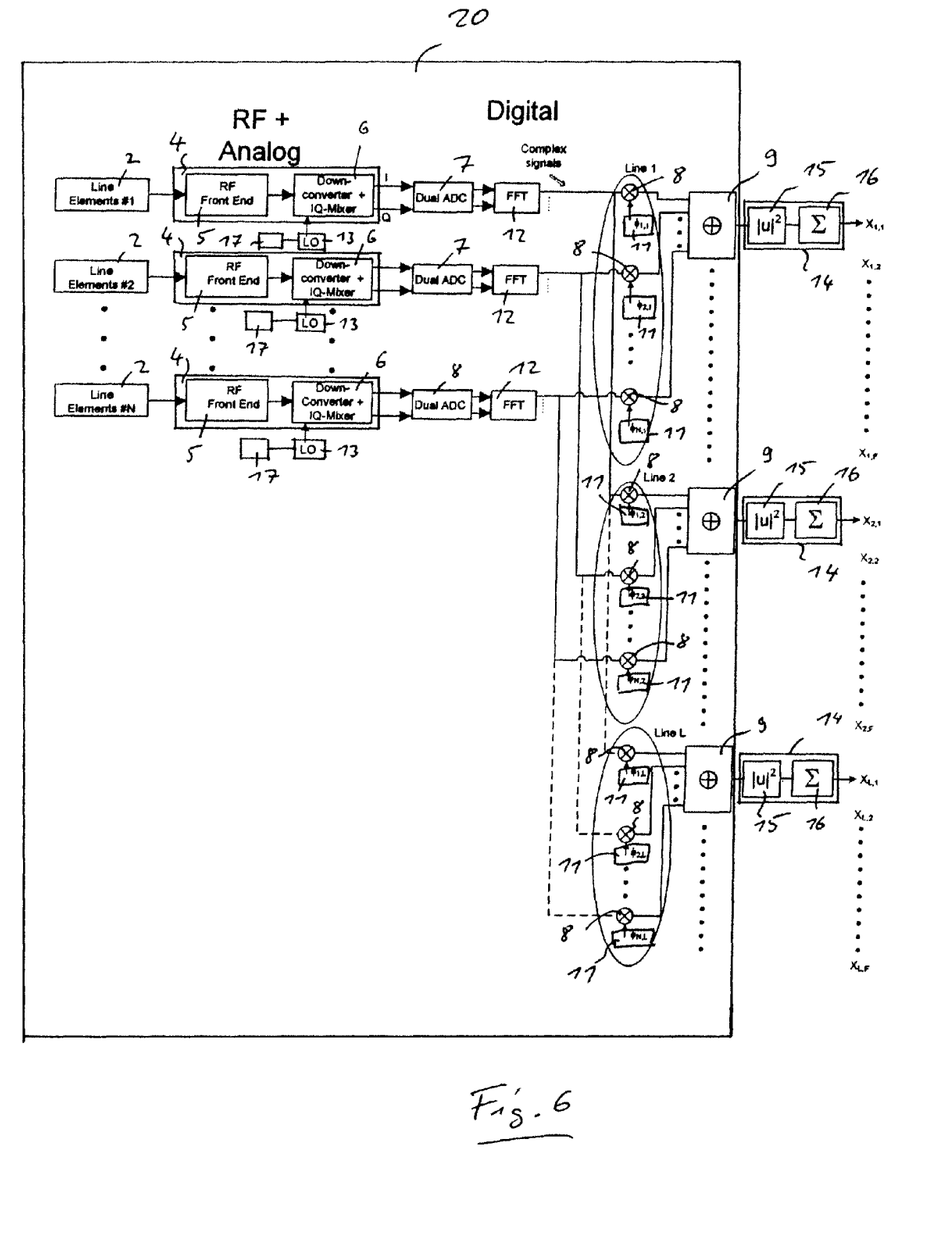
FIG. 6 shows a schematic block diagram of a third embodiment of a receiving apparatus and processing means according to the present invention, and FIG. 7 schematically explains the scanning of a two-dimensional image pixel space in the third embodiment.
Figure 7:
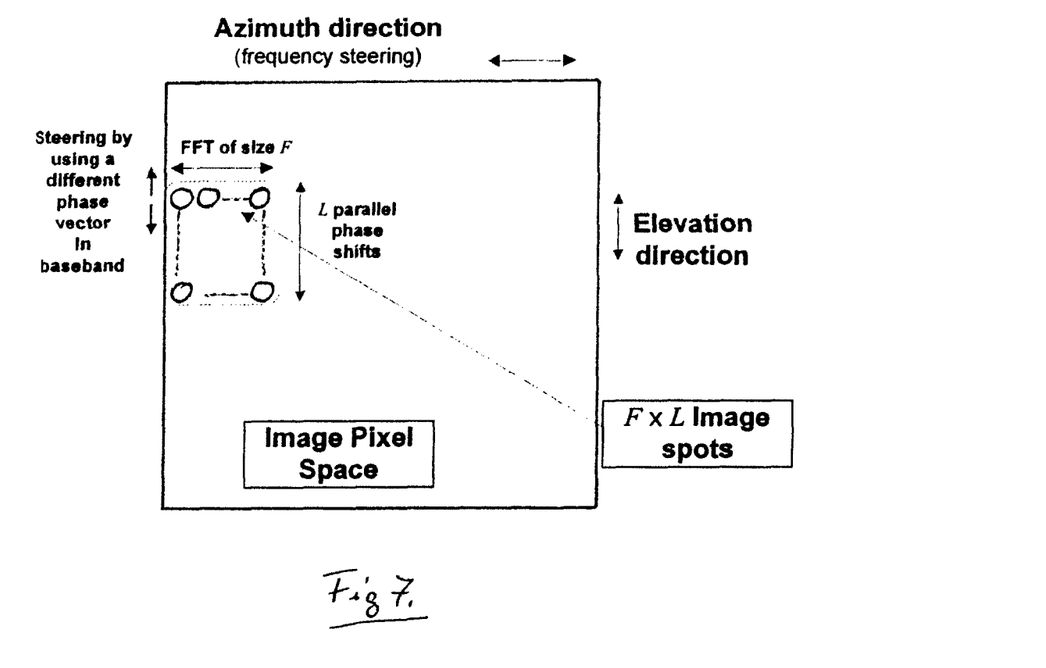

In order to improve the performance in terms of speed and/or temperature sensitivity of the second embodiment even further, the third embodiment proposes the processing of even more image spots (image pixels) at the same time. In this approach, multiple phase shifts are applied to each output line of each of the FFT means 12 in each receiver channel at the same time and in parallel. In other words, each of the F output lines of each of the Fourier transformation means 12 of each receiver channel of the receiving apparatus 20 of the third embodiment is branched into L branch (or lines), wherein each branch comprises a respective phase shifting means 8 controlled by a respective phase shift control means 11. The receiving apparatus 20 of the third embodiment as shown in FIG. 6 further comprises F×L combining means 9, each receiving the L-th branch of each one of the respective F-th output lines from each FFT means 12 of each receiver channel. Thus, the signal in each output line of each FFT means 12 is shifted by L different phase shifts at the same time. Each combined output signal 9 from each of the combining means 9 is further processed in a processing means 14 depending on the respective implementation as described in relation to the first and the second embodiment. All other elements of the receiving apparatus 20 of the third embodiment shown in FIG. 6 correspond to the elements described in relation to the second and the first embodiment, respectively. From an implementation point of view, the receiving apparatus 20 of the third embodiment enables the processing and generation of many image pixels at the same time and parallel with only N FFT means 12 and N analogue-to-digital conversion means 7. FIG. 7 shows a schematic example of dimensional image space scanned by the receiving apparatus 20 of the third embodiment. As shown, F×L image spots (pixels) can be scanned simultaneously.

It is to be understood that various elements and means described for the receiving apparatus 1, 10 and 20 of the various embodiments can be implemented by any kind of suitable hardware, software or any kind of suitable combination thereof. The term 'means' is intended to cover any kind of suitable unit, element, device, part of a unit or device and so forth and thus any kind of possible technical implementation of the functionalities explained above. Further, a real world implementation of a receiving apparatus or an imaging apparatus according to the present invention might require additional elements, functionalities, units and so forth which are not shown in the present drawings and not explained in the present specification for the sake of clarity.

The invention claimed is:

1. A receiving apparatus configured to receive high frequency signals and to provide combined signals based on the received high frequency signals, the combined signals enabling generation of an image, comprising:
   two or more receiver channels, each receiver channel comprising an antenna pattern comprising plural antenna elements, the antenna elements being configured to receive high frequency signals;
   circuitry configured to:
   process the high frequency signals received by the antenna elements into baseband signals;
   perform analog-to-digital conversion to convert the baseband signals into digital signals;
   perform phase shifting of the digital signals;
   control the phase shifting to vary the phase shifts of the receiver channels such that receiving characteristics of the two or more receiver channels are controlled to form sharp antenna beams, and to move a position of the sharp antenna beams in at least one dimension of a first area of an image pixel space; and
   combine the phase shifted digital signals from the receiver channels into the combined signals, so that while the position of the sharp antenna beams is moved in the at least one dimension of the first area of the image pixel space, image formation of a second area of the image pixel space different from the first area is processed in a serial fashion.

2. The receiving apparatus according to claim 1, wherein the digital signals are complex signals, and the circuitry is further configured to perform a complex multiplication.

3. The receiving apparatus according to claim 1, wherein the digital signals are complex signals, and
the circuitry is further configured to perform a complex summation.

4. The receiving apparatus according to claim 1, wherein the antenna patterns of the two or more receiver channels are mechanically steered.

5. The receiving apparatus according to claim 1, wherein the circuitry is further configured to perform an F point Fourier transformation on the digital signals, and output to F output lines, F being an integer.

6. The receiving apparatus according to claim 5, further comprising F combining circuitry, wherein the circuitry configured to perform the phase shifting is respectively arranged between the circuitry configured to perform the analog-to-digital conversion and the circuitry configured to perform the F point Fourier transformation on the digital signals, and
wherein the F combining circuitry is configured to receive the respective F-th output line from each output F point Fourier transformation.

7. The receiving apparatus according to claim 6, further comprising L combining circuitry, wherein the circuitry configured to perform the phase shifting is respectively arranged along each of the F output lines, and
wherein the F combining circuitry is configured to receive the respective F-th output line from each output F point Fourier transformation.

8. The receiving apparatus according to claim 7, further comprising:
F×L combining circuitry, wherein each of the F output lines is branched into L branches, each branch comprising circuitry configured to perform phase shifting, and
wherein each of the F×L combining circuitry is configured to receive the L-th branch of each one of the respective F-th output line from each output F point Fourier transformation.

9. The receiving apparatus according to claim 1, further comprising circuitry configured to:
provide local oscillator signals to the circuitry configured to process the high frequency signals received by the antenna elements into baseband signals; and
provide local oscillator signal control to vary the frequency of the local oscillator signals to vary receiving characteristics of the antenna patterns.

10. An imaging apparatus, comprising:
a receiving apparatus according to claim 1; and
circuitry configured to generate an image from the combined phase shifted signals.

11. The imaging apparatus according to claim 10, being a passive imaging apparatus, wherein the circuitry configured to process the high frequency signals received by the antenna elements into baseband signals performs an absolute value calculation and an integration calculation.

12. A receiving method for receiving high frequency signals and for providing combined signals based on the received high frequency signals, the combined signals enabling generation of an image, comprising:
in each of two or more receiving channels, each receiving channel comprising an antenna pattern with plural antenna elements, receiving, using circuitry, high frequency signals in each of the antenna elements;
processing, using the circuitry, the high frequency signals received by the antenna elements into baseband signals;
analog-to-digital converting, using the circuitry, the baseband signals into digital signals;
phase shifting, using the circuitry, the digital signals;
controlling the phase shifting, using the circuitry, to vary the phase shifts of the receiver channels such that receiving characteristics of the two or more receiver channels are controlled to form sharp antenna beams, and to move a position of the sharp antenna beams in at least one dimension of a first area of an image pixel space; and
combining, using the circuitry, the phase shifted digital signals from each of the receiving channels into the combined signals, so that while the position of the sharp antenna beams is moved in the at least one dimension of the first area of the image pixel space, image formation of a second area of the image pixel space different from the first area is processed in a serial fashion.

13. An imaging method comprising the receiving method according to claim 12, and further comprising generating an image from the combined signals.

* * * * *